United States Patent
Yasuda

(10) Patent No.: US 6,372,169 B1
(45) Date of Patent: Apr. 16, 2002

(54) PROCESS FOR PRODUCING A PLASTIC SHEET

(76) Inventor: Eitoku Yasuda, 5-3-2-501, Funabori, Edogawa-ku, Tokyo 134-0091 (JP)

( * ) Notice: Subject to any disclaimer, the term of this patent is extended or adjusted under 35 U.S.C. 154(b) by 0 days.

(21) Appl. No.: 09/391,650

(22) Filed: Sep. 7, 1999

(30) Foreign Application Priority Data

Sep. 14, 1998 (JP) ............................................. 10-260092

(51) Int. Cl.[7] ........................ B32B 31/08; D01D 10/00; B29C 71/00

(52) U.S. Cl. ............................. 264/172.19; 264/173.1; 264/237

(58) Field of Search ........................ 264/172.19, 173.1, 264/237

(56) References Cited

U.S. PATENT DOCUMENTS

| | | | | |
|---|---|---|---|---|
| 4,455,343 A | * | 6/1984 | Temple | 428/285 |
| 4,968,726 A | * | 11/1990 | Thorsrud | 523/137 |
| 5,194,190 A | * | 3/1993 | Kim | 264/25 |
| 6,221,294 B1 | * | 4/2001 | Goedecke et al. | 264/141 |

* cited by examiner

Primary Examiner—Christopher A. Fiorilla
(74) Attorney, Agent, or Firm—Young & Thompson

(57) ABSTRACT

A plastic sheet is prepared which is a laminate sheet including one or more laminated layers or a sheet of a thick single layer at a high temperature using a polyolefin molding matrial including an inorganic filler and a polyolefin resin as a substrate material. The plastic sheet is cooled by passing between a lower endless matal belt and an upper endless metal belt disposed on top of the lower belt, each belt being disposed with tension along a loop surrounding two rolls, moving along the loop and being cooled by direct contact with cooling water.

8 Claims, 4 Drawing Sheets

PROCESS FOR PRODUCING A PLASTIC SHEET

BACKGROUND OF THE INVENTION

1. Field of the Invention

The present invention relates to an apparatus for producing a plastic sheet and a process for producing a plastic sheet using the same. More particularly, the present invention relates to an apparatus for producing a laminate sheet having one or more layers or a sheet of a thick single layer using a polyolefin molding material comprising an inorganic filler and a polyolefin resin as the substrate material without warp, with an excellent flatness of the surface, in a reduced cooling time and with excellent productivity and a process for producing the above laminate sheet or the above sheet of a thick single layer using this apparatus.

2. Description of Related Art

Materials heretofore used as decorative panels at the face of furnitures and cabinets of kitchen products have a structure in which decorative sheets having printed patterns such as wood patterns are laminated to a wooden material, an inorganic material or a metal material such as a steel plate with an adhesive.

Sheets of vinyl chloride resins are generally used as the decorative sheets used for such decorative panels due to a suitable degree of flexibility and excellent workability in V-cutting and lapping. However, the sheets of vinyl chloride resins have drawbacks in that durability such as resistance to wear, scratches and dents and the property for cleaning are inferior, that environmental problems are caused due to formation of toxic substances such as chlorine and dioxine during incineration and that plasticizers contained therein tend to bleed to cause inferior appearance.

Therefore, development of a decorative sheet or a decorative panel having excellent durability, an excellent property for cleaning and excellent workability such as workability in V-cutting without using a vinyl chloride resin has been desired.

As decorative materials for buildings, wood and vinyl chloride resins have been used mainly. However, it is inevitable that the use of wood is restricted to protect forests. The vinyl chloride resins have the drawbacks described above. Therefore, development of decorative materials for buildings which do not cause environmental problems without using wood or a vinyl chloride resin has been desired.

As the decorative material without the use of wood or a vinyl chloride resin, composite plates in which a synthetic resin such as a polyolefin resin is used as a core material and two sheets of a metal such as aluminum, iron and stainless steel are laminated to both faces of the core material have been-developed and are actually used. These composite plates show excellent light weight, workability and impact strength and are used as interior and outer decorative members.

Sheets of a thick single layer which are made of polyolefin resins and have a thickness of 5 to 15 mm are also attracting attention as various products such as chopping boards and molding boxes for concrete.

When decorative sheets, decorative panels, decorative materials for buildings and sheets of a thick single layer are produced, it is very important that excellent products without warp are produced with excellent productivity from the standpoint of the production cost and commercial value.

When a laminate sheet prepared at a high temperature by melt adhesion of layers under heating to a substrate sheet of a polyolefin resin or a sheet of a thick single layer prepared at a high temperature from a polyolefin resin is continuously cooled, the sheet is generally introduced into a cooling apparatus equipped with a plurality of cooling rolls through which cooling water is passed for cooling. Since rapid cooling is not preferable, the temperature of cooling water is adjusted in a manner such that the temperature decreases stepwise from cooling rolls at upstream positions to cooling rolls at downstream positions and the temperature of the sheet is reduced approximately to the room temperature at the outlet of the apparatus.

However, the above method of cooling has drawbacks in that productivity is poor due to a long time required for cooling and that warp of the produced sheet tends to take place.

When many types of decorative sheets or decorative panels are produced in small amounts, the laminates are generally prepared by melt adhesion under heating or dry lamination in accordance with a batch pressing process and the prepared products are cooled just by being left standing. This process has a drawback in that it takes an excessively long time for cooling to cause poor productivity.

SUMMARY OF THE INVENTION

An object of the present invention is to provide an apparatus for producing a plastic sheet which can produce various types of laminate sheets and sheets of a thick single layer having various thickness such as decorative sheets, decorative panels and decorative building materials, which do not form toxic substances such as chlorine gas during incineration and do not cause environmental problems, without warp, with an excellent flat surface, in a reduced cooling time and with excellent productivity and to provide a process for producing the above laminate sheets and the sheets of a thick single layer using the above apparatus with excellent productivity.

As the result of extensive studies by the present inventors to achieve the above object, it was found that an apparatus comprising at least a mechanism for preparing a laminate sheet or a sheet of a thick single layer using a polyolefin molding material comprising an inorganic filler and a polyolefin resin as the substrate material and a cooling mechanism having a specific construction can be advantageously used to achieved the above object and that, using this apparatus, the above laminate sheet and the above sheet of a thick single layer can be produced without warp, with an excellent flat surface and with excellent productivity. The present invention has been completed on the basis of the knowledge.

The present invention provides:

(1) An apparatus for producing a plastic sheet which comprises at least (A) a mechanism for preparing a plastic sheet which is a laminate sheet comprising one or more laminated layers or a sheet of a thick single layer at a high temperature using a polyolefin molding material comprising an inorganic filler and a polyolefin resin as a substrate material and (B) a cooling mechanism for cooling the plastic sheet which is prepared by mechanism (A) and at a high temperature, wherein cooling mechanism (B) comprises a cooling apparatus which comprises a lower endless metal belt and an upper endless metal belt disposed on top of the lower belt, each belt being disposed with tension along a loop surrounding two rolls, movable along the loop and cooled by direct contact with cooling water, so that the plastic sheet at a high temperature is held between the belts and cooled at both sides;

(2) An apparatus described in (1), wherein cooling mechanism (B) comprises a plurality of cooling apparatuses which are arranged in series and each comprises a lower endless metal belt and an upper endless metal belt disposed on top of the lower belt, each belt being disposed with tension along a loop surrounding two rolls, movable along the loop and cooled by direct contact with cooling water;

(3) An apparatus described in (2), wherein cooling mechanism (B) comprise two cooling apparatuses arranged in series;

(4) An apparatus described in (1), wherein cooling mechanism (B) comprises one cooling apparatus which comprises a lower endless metal belt and an upper endless metal belt disposed on top of the lower belt, each belt being disposed with tension along a loop surrounding two rolls, movable along the loop and cooled by direct contact with cooling water, wherein each belt is equipped with a mechanism for cooling the plastic sheet at a high temperature in a manner such that a front portion of the belt which is a portion closer to a front roll and a rear portion of the belt which is a portion closer to a rear roll are cooled separately by direct contact with water at different temperatures while the belt is in movement;

(5) A process for producing a plastic sheet comprising, using an apparatus described in (1), (a) preparing a plastic sheet which is a laminate sheet comprising one or more laminated layers or a sheet of a thick single layer at a high temperature using a polyolefin molding material comprising an inorganic filler and a polyolefin resin as a substrate material and (b) cooling the plastic sheet which is prepared in step (a) and at a high temperature, wherein the plastic sheet is cooled by passing between a lower endless metal belt and an upper endless metal belt disposed on top of the lower belt, each belt being disposed with tension along a loop surrounding two rolls, moving along the loop and being cooled by direct contact with cooling water;

(6) A process described in (5), which comprises cooling the plastic sheet at a high temperature using a plurality of apparatuses described in (2) in a plurality of stages, wherein, in step (b), a temperature of the lower endless metal belt and the upper endless metal belt disposed on top of the lower belt in each cooling apparatus is adjusted while the belts are in movement along the loop in a manner such that a temperature of the belts in a cooling apparatus at a downstream position is successively lower than a temperature of the belts in another apparatus at an upstream position, the belts in a cooling apparatus at a most upstream position are directly cooled with water at a temperature of 10 to 40° C. and the belts in a cooling apparatus at a most downstream position is directly cooled with water at a temperature of 4 to 10° C.;

(7) A process described in (5), which comprises cooling the hot plastic sheet using an apparatus described in (4), wherein, in step (b), each of the lower endless metal belt and the upper endless metal belt disposed on top of the lower belt in the cooling apparatus is cooled while the belt is in movement along the loop in a manner such that a portion of the belt at an upstream position is directly cooled with water at a temperature of 10 to 40° C. and a portion of the belt at a downstream position is directly cooled with water at a temperature of 4 to 10° C.;

(8) A process for producing a plastic sheet described in any of (5), (6 ) and (7), wherein the polyolefin molding material comprises 20 to 80% by weight of an inorganic filler; and (9). A process for producing a plastic sheet described in (8), wherein the inorganic filler is at least one filler selected from the group consisting of calcium carbonate, aluminum hydroxide and magnesium hydroxide.

Figure 1:
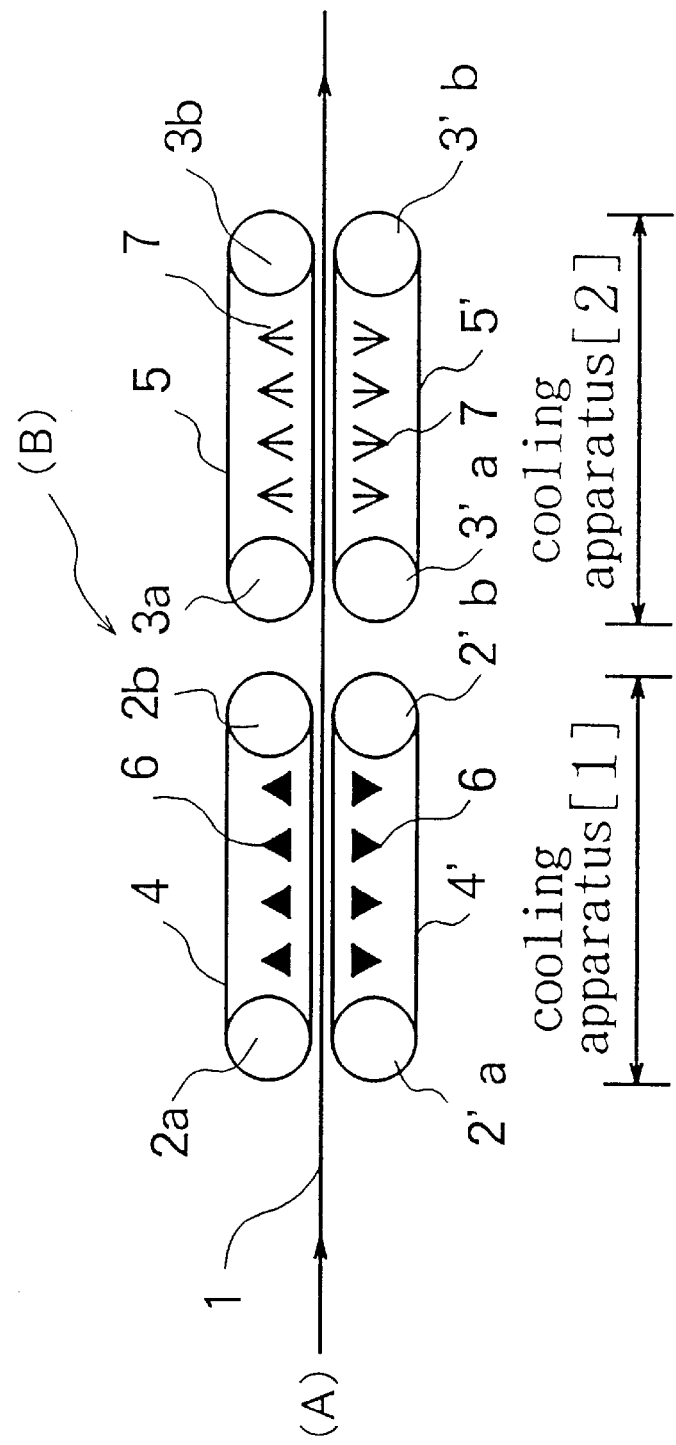
FIG. 1 shows a schematic side view of an embodiment of the cooling mechanism in the apparatus of the present invention.

1: A plastic sheet
2a: A front roll
2'a: A front roll
2b: A rear roll
2'b: A rear roll
3a: A front roll
3'a: A front roll
3b: A rear roll
3'b: A rear roll
4: An endless metal belt
4': An endless metal belt
5: An endless metal belt
5': An endless metal belt
6: Cooling water at a higher temperature
7: Cooling water at a lower temperature
8a: A front roll
8'a: A front roll
8b: A rear roll
8'b: A rear roll
9: An endless metal belt
9': An endless metal belt
11: A substrate sheet of a polypropylene resin
12: A layer of a colored olefin elastomer film
13: A patterned layer
14: A layer of a transparent polypropylene film
14': A layer of a biaxially stretched polyethylene terephthalate film
15: An adhesive layer
15': An adhesive layer
15": An adhesive layer
16: A layer of an aluminum sheet
16': A layer of an aluminum sheet
17: A layer of an acrylic resin
18: A layer of an adhesive polypropylene film
19: A polyethylene synthetic paper
20: A clear coat layer
21: A laminate having a pattern of black granite
22: A non-woven fabric of polyethylene terephthalate

DESCRIPTION OF THE PREFERRED EMBODIMENTS

The apparatus for producing a plastic sheet and the process for producing a plastic sheet of the present invention is applied to production of a laminate sheet comprising one or more laminated layers and a sheet of a thick single layer in which a polyolefin molding material comprising an inorganic filler and a polyolefin resin is used as the substrate material.

The polyolefin resin used in the polyolefin molding material in the present invention is not particularly limited. Examples of the polyolefin resin include homopolymers and copolymers of α-olefins such as ethylene, propylene, butene-1, 3-methylbutene-1, 3-methylpentene-1 and 4-methylpentene-1 and copolymers of these α-olefins with other unsaturated monomers copolymerizable with the α-olefins. Specific examples of the polyolefin resin include polyethylenes such as high density polyethylene, medium density polyethylene, low density polyethylene, linear low density polyethylene, ultra-high molecular weight polyethylene, copolymers of ethylene and vinyl acetate and copolymers of ethylene and ethyl acrylate; polypropylenes such as homopolymer of propylene, block copolymers of propylene and ethylene, random copolymers of propylene and ethylene and copolymers of propylene, ethylene and diene compounds; polybutene-1; and poly-4-methylpentene-1. Among these polyolefin resins, crystalline polypropylene resins are preferable.

Examples of the crystalline polypropylene resin include isotactic homopolymer of propylene having crystallinity, random copolymers of ethylene and propylene containing a minor amount of the ethylene unit, block copolymers of propylene composed of a homopolymer portion composed of a propylene homopolymer and a copolymer portion composed of an ethylene-propylene random copolymer containing a relatively great amount of the ethylene unit and crystalline copolymers of propylene, ethylene and α-olefin having a structure in which the homopolymer portion or the copolymer portion of the above block copolymer of propylene further contains the unit of an α-olefin such as butene-1 incorporated into the copolymer. The melt index of the polypropylene resin (measured at 230° C. under 2.16 kgf) is not particularly limited. It is preferable that the melt index is in the range of 0.3 to 13.0 g/10 minutes and more preferably in the range of 0.5 to 8.0 g/10 minutes.

A single type or a combination of two or more types of the polyolefin resin may be used. A regenerated resin may also be used.

It is preferable that the polyolefin molding material used in the present invention comprises 20 to 80% by weight and more preferably 30 to 70% by weight of an inorganic filler. When the content of the inorganic filler is less than 20% by weight, workability in cutting and rigidity are insufficient. When the content or inorganic filler exceeds 80% by weight, the molding property to form a sheet and impact resistance becomes inferior and the weight increases. Therefore, contents outside the above range are not preferable.

Examples of the inorganic filler include calcium carbonate, magnesium carbonate, aluminum hydroxide, magnesium hydroxide, kaolin, silica, perlite, calcium sulfate, barium sulfate, baked alumina, calcium silicate, talc and mica. A single type or a combination of two or more types of the inorganic filler may be used.

Among the above inorganic fillers, calcium carbonate, aluminum hydroxide and magnesium hydroxide are preferable and calcium carbonate is more preferable from the standpoint of the cutting property and economy. Calcium carbonate is not particularly limited. Any of precipitated calcium carbonate, heavy calcium carbonate and light calcium carbonate can be used. The average particle diameter of calcium carbonate is generally in the range of 0.05 to 200 μm and more preferably in the range of 0.5 to 20 μm.

Into the polyolefin molding material, various types of additives such as antioxidants, heat stabilizers, ultraviolet light absorbents, light stabilizers, chlorine scavengers, flame retardants, auxiliary flame retardants, lubricants, process oils, mold releases and coloring agents, other thermoplastic resins and other thermoplastic elastomers may suitably be incorporated where desired.

To prepare the polyolefin molding material, the above polyolefin resin, the above inorganic filler such as calcium carbonate preferably in an amount of 20 to 80% by weight of the amount of the entire molding material and various additives used where desired are mixed together. The obtained mixture is mixed by a tumbler blender or a Henschel mixer. This mixture may be further melt mixed by a single screw extruder, a twin screw extruder, a kneader or a Banbury mixer and then granulated to prepare the polyolefin molding material.

In the present invention, the polyolefin molding material may be expanded to prepare a base foam substrate sheet having a suitable degree of expansion. Using this sheet, a laminate sheet having one or more laminated layers may be formed or a foam sheet of a thick single layer may be formed. A foam sheet of a thick single layer is generally used in combination with a skin layer formed on the surface thereof.

The apparatus for producing a plastic sheet of the present invention comprises at least (A) a mechanism for preparing the above plastic sheet which is a laminate sheet comprising one or more laminated layers or a sheet of a thick single layer at a high temperature using the above polyolefin molding material as the substrate material and (B) a cooling mechanism for cooling the plastic sheet which is prepared by mechanism (A) and at a high temperature.

Mechanism (A) for preparing a plastic sheet of the above apparatus is not particularly limited as long as the mechanism is an apparatus conventionally used for preparing a laminate sheet or a sheet of a thick single layer at a high temperature using a polyolefin molding material as the substrate material. A continuous apparatus or a batch apparatus can be used. A continuous apparatus is generally used for producing a sheet of a thick single layer. To produce a laminate sheet, a continuous apparatus is advantageously used for mass production and lamination in accordance with a batch pressing process is advantageous for production of many types in small quantities.

Using mechanism (A) for preparing a plastic sheet, a plastic sheet is prepared at a high temperature. The temperature is suitably selected depending on the type of the polyolefin resin and the process of lamination such as melt adhesion under heating and dry lamination.

Cooling mechanism (B) which is characteristic of the present invention comprises a cooling apparatus which comprises a lower endless metal belt and an upper endless metal belt disposed on top of the lower belt, each belt being disposed with tension along a loop surrounding two rolls, movable along the loop and cooled by direct contact with cooling water, so that the plastic sheet at a high temperature is held between the belts and cooled at both sides.

The lower endless metal belt and the upper endless metal belt disposed on top of the lower belt each moves by rotation of a front roll and a rear roll along the loop. The front roll and the rear roll are rotated in a manner such that the portion of the belt in contact with the surface of the plastic sheet moves from an upstream position which is closer to mechanism (A) toward a downstream position which is farther from mechanism (A).

In cooling mechanism (B), it is not preferable that the plastic sheet which is transferred from mechanism (A) and at a high temperature is cooled rapidly but it is preferable that the plastic sheet is cooled stepwise. Therefore, mechanisms having the following constructions are preferable: (1) a construction having a plurality of cooling apparatuses which are arranged in series and each comprises a lower endless metal belt and an upper endless metal belt disposed on top of the lower belt, each belt being disposed with tension along a loop surrounding two rolls, movable along the loop and cooled by direct contact with cooling water; and (2) a construction having one cooling apparatus which comprises a lower endless metal belt and an upper endless metal belt disposed on top of the lower belt, each belt being disposed with tension along a loop surrounding two rolls, movable along the loop and cooled by direct contact with cooling water, wherein each belt is equipped with a mechanism for cooling the plastic sheet at a high temperature in a manner such that a front portion of the belt which is a portion closer to a front roll and a rear portion of the belt which is a portion closer to a rear roll are cooled separately by direct contact with water at different temperatures while the belt is in movement.

From the standpoint of the efficiency of cooling and economy, it is preferable that a multi-stage cooling method is adopted using the cooling mechanism having construction (1). In the multi-stage cooling method, each endless metal belt in a cooling apparatus at a most upstream position is directly cooled with water at a temperature of 10 to 40° C. and each endless metal belt in a cooling apparatus at a most downstream position is directly cooled with water at a temperature of 4 to 10° C. Two-stage cooling using two cooling apparatuses arranged in series is more preferable.

To cool the endless metal belt, in general, shower of cooling water is directly applied to the endless metal belt. It is necessary that the apparatus be constructed so as to prevent contact of cooling water with the plastic sheet. In each cooling apparatus, water coming down from the endless metal belts is recovered at a receiver of cooling water disposed below the pair of endless metal belts, i.e., the lower endless metal belt and the upper endless metal belt disposed on top of the lower belt. When the two-stage cooling is used, recovered water at a higher temperature is transferred to a cooling tower and cooled to about 10 to 40° C. for recycling. Recovered water at a lower temperature is transferred to a refrigerator and cooled to about 4 to 10° C. for recycling.

When the cooling mechanism has construction (2), one cooling apparatus is used and the endless metal belts are directly cooled with water. From the standpoint of the cooling efficiency and economy, it is preferable that each of the lower endless metal belt and the upper endless metal belt disposed on top of the lower belt in the cooling apparatus is cooled while in movement along the loop in a manner such that a portion of the belt at an upstream position (closer to the front roll) is directly cooled with water at a temperature of 10 to 40° C. and a portion of the belt at a downstream position (closer to the rear roll) is directly cooled with water at a temperature of 4 to 10° C.

To cool the endless metal belt, in general, shower of cooling water is directly applied to the endless metal belt. It is necessary that the apparatus be constructed so as to prevent contact of cooling water with the plastic sheet and to recover cooling water at one temperature separately from water at another temperature. The method of the recovery is not particularly limited. For example, to recover water from the upper endless belt, a rubber strip having a height of about 20 mm is adhered to each end portion in the transverse direction of the inner face of the belt. A rectangular pool for water having two separate portions is made of a rubber sponge and placed on the lower flat portion of the moving upper endless metal belt. The recovered water is received in either one of the portions of the pool depending on the temperature. Water overflowed from each portion of the pool is recovered separately in each corresponding receiver disposed below.

To recover water from the lower endless metal belt, a portion at an upstream position and a portion at a downstream position of the upper flat portion of the lower endless metal belt are applied with upward shower of water at different temperatures. Water coming down from the belt is recovered into either one of two separate receivers depending on the temperature. It is preferable that a rubber strip having a height of about 20 mm is adhered to each end portion in the transverse direction of the inner face of the belt so as to prevent contact of water with the plastic sheet.

Recovered water at a higher temperature is transferred to a cooling tower and cooled to about 10 to 40° C. for recycling. Recovered water at a lower temperature is transferred to a refrigerator and cooled to about 4 to 10° C. for recycling In cooling mechanism (B), it is preferable that the upper endless metal belt has a greater width than the width of the lower endless metal belt in each cooling apparatus. The width of the upper endless metal belt is generally about 800 to 1,500 mm and the width of the lower endless metal belt is generally about 700 to 1,400 mm.

The endless metal belt is generally made of stainless steel, carbon steel or a titanium alloy. It is preferable that the belt is made of stainless steel. The thickness of the belt is generally selected in the range of 0.5 to 1.5 mm.

Figure 2:
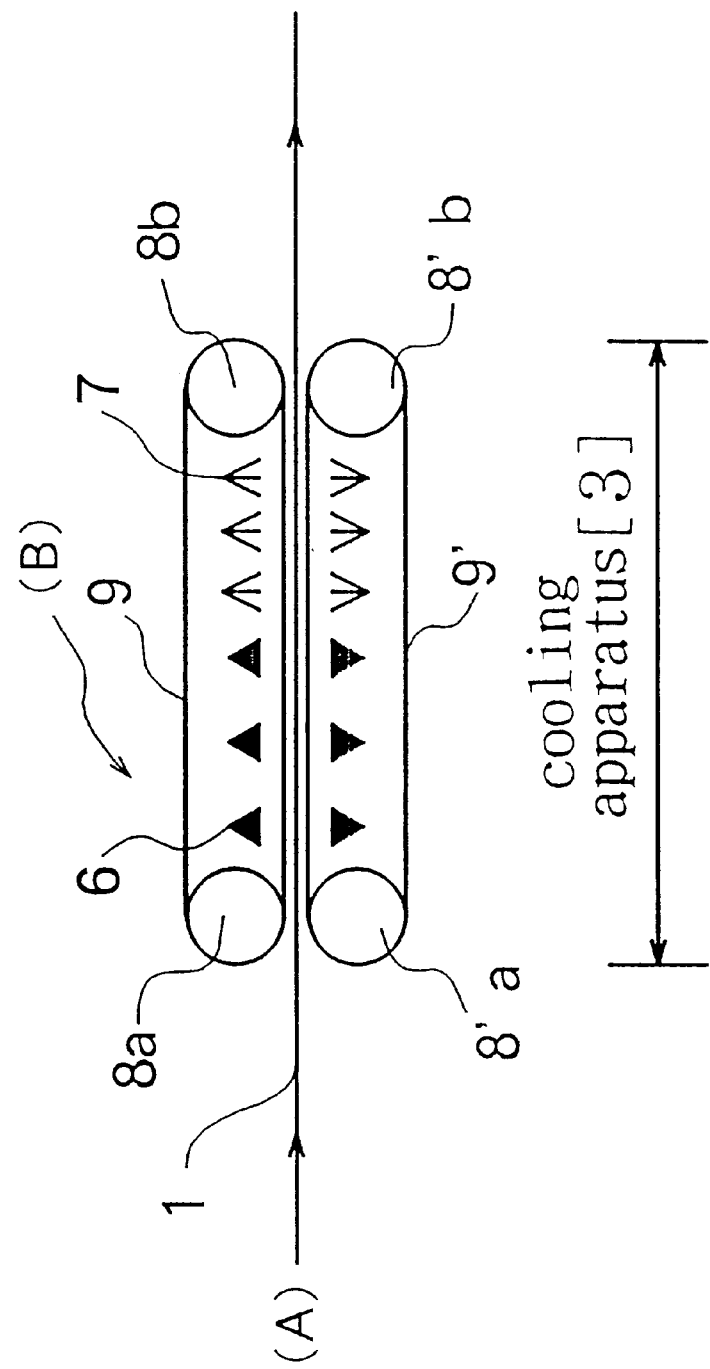
FIG. 2 shows a schematic side view of another embodiment of the cooling mechanism in the apparatus of the present invention.

FIGS. 1 and 2 show schematic side views of embodiments of the cooling mechanism having different constructions used in the apparatus of the present invention. In the embodiment shown in FIG. 1, the construction has two cooling apparatuses arranged in series. In the embodiment shown in FIG. 2, the construction has one cooling apparatus.

FIG. 1 shows an embodiment of cooling mechanism (B) in which cooling apparatus [1] and cooling apparatus [2] are arranged in series. In cooling apparatus [1], an endless metal belt 4 disposed with tension along a loop surrounding a front roll 2a and a rear roll 2b is disposed at the upper side of the plastic sheet. An endless metal belt 4' disposed with tension along a loop surrounding a front roll 2'a and a rear roll 2'b is disposed at the lower side of the plastic sheet. Each of the endless metal belts 4 and 4' is directly cooled with cooling water 6 at a higher temperature such as about 10 to 40° C. In cooling apparatus [2], an endless metal belt 5 disposed with tension along a loop surrounding a front roll 3a and a rear roll 3b is disposed at the upper side of the plastic sheet. An endless metal belt 5' disposed with tension along a loop surrounding a front roll 3'a and a rear roll 3'b is disposed at the lower side of the plastic sheet. Each of the endless metal belts 5 and 5' is directly cooled with cooling water 7 at a lower temperature such as about 4 to 10° C.

The plastic sheet 1 at a high temperature which is transferred from mechanism (A) passes through cooling apparatus [1] and cooling apparatus [2] and is cooled approximately to the room temperature.

FIG. 2 shows another embodiment of cooling mechanism (B) having one cooling apparatus [3]. In cooling apparatus

[3], an endless metal belt 9 disposed with tension along a loop surrounding a front roll 8a and a rear roll 8b is disposed at the upper side of the plastic sheet. An endless metal belt 9' disposed with tension along a loop surrounding a front roll 8'a and a rear roll 8'b is disposed at the lower side of the plastic sheet. Each of the endless metal belts 9 and 9' is directly cooled with cooling water in a manner such that a portion at an upstream position is cooled with water 6 at a higher temperature such as about 10 to 40° C. and a portion at an downstream position is cooled with water 7 at a lower temperature such as about 4 to 10° C.

The plastic sheet 1 at a high temperature which is transferred from mechanism (A) passes through cooling apparatus [3] and is cooled approximately to the room temperature.

When mechanism for preparing a plastic sheet (A) used in the present invention is continuous, a cutting mechanism is generally disposed at the downstream position of cooling mechanism (B). The cutting mechanism is used for cutting the plastic sheet cooled approximately to the room temperature to a desired dimension. As the cutting mechanism, a cutting machine conventionally used for producing plastic sheets is used.

The process for producing a plastic sheet of the present invention will be described in the following.

In the process of the present invention, using the apparatus for producing a plastic sheet described above, a plastic sheet is prepared in accordance with (a) a step of preparing a laminate sheet comprising one or more laminated layers or a sheet of a thick single layer at a high temperature using a polyolefin molding material comprising an inorganic filler and a polyolefin resin as the substrate material and (b) a step of cooling the laminate sheet or the sheet of a thick single layer which is prepared in step (a) and at a high temperature.

In step (a) of the present invention, a laminate sheet or a sheet of a thick single layer is prepared at a high temperature using the polyolefin molding material as the substrate material. The process for the preparation is not particularly limited. A continuous process or a batch process may be used.

In the preparation of the laminate sheet, one or more laminate layers are formed on a substrate sheet made of a polyolefin resin. For example, when the laminate sheet is prepared continuously, one or more laminate materials are successively supplied to the front face and/or the back face of the substrate sheet made of a polyolefin resin which is continuously transferred to the mechanism for preparing a laminate sheet. The supplied laminate materials are laminated to the substrate sheet by dry lamination using an adhesive or melt adhesion under heating to prepare a laminate sheet having one or more laminated layers.

The laminate material laminated to the surface of the substrate sheet of a polyolefin resin is not particularly limited and various types of materials can be used. Specific examples of the laminate material include metal sheets, transparent or colored plastic films, transparent plastic films having patterns, transfer films and clear films.

Examples of the metal sheet include sheets of metals such as aluminum, stainless steel, iron, copper, titanium, tin and nickel and sheet of various types of alloys. Among these metal sheets, sheets of aluminum, stainless steel and iron are preferable and sheets of aluminum are more preferable. The thickness of the metal sheet is generally about 0.1 to 1 mm.

The transparent plastic film having a pattern is prepared by forming a layer of a pattern of wood, a pattern of stone, a pattern of the surface of natural leather, a pattern of cloth or an abstract pattern on one face of a transparent plastic film having a thickness of about 0.03 to 0.5 mm in accordance with a conventional method of printing such as the gravure printing, the screen printing, the offset printing or the flexo printing. The thickness of the ink forming the pattern is generally about 2 to 30 $\mu$m. When the transparent plastic film having a patterns is laminated, the film is generally laminated in a manner such that the patterned layer is placed on the side of the substrate sheet.

The transfer film generally has a structure in which a layer of a releasing agent, a layer having a pattern and an adhesive layer are successively laminated to one face of a substrate film. When the transfer film is laminated to an article in a manner such that the adhesive layer is placed on the side of the article and then the substrate film is removed, the layer having a pattern is transferred to the article. A mechanism which allows release of the substrate must be provided in this case because the substrate film must be removed. In the transfer film, a protective layer may be formed between the layer of a releasing agent and the layer having a pattern to protect the layer having a pattern after being transferred.

The clear film is generally formed on the surface of laminated layers to provide wear resistance, weatherability, scratch resistance and antifouling property to the sheet and to give depth to the layer having a pattern. Films of acrylic resins, polyurethane resins and polypropylene resins are preferably used. The thickness of the clear film is generally about 0.03 to 0.2 mm.

As the laminate material, craft paper, printing paper, non-woven fabrics and woven fabrics may also be used. Sheets having a pattern of stone such as a pattern of marble and a pattern of granite may also be used. The sheet having a pattern of granite can be formed by dispersing small pieces of colored macromolecular films in a transparent plastic film.

When the laminate material is the same type as the resin of the substrate sheet or when the laminate material is a different type from the resin of the substrate sheet and is a material which can be melt adhered under heating utilizing the anchor effect, such as various types of non-woven fabrics, woven fabrics and craft paper, it is advantageous that the laminate material is laminated by melt adhesion under heating.

When the laminate material is melt adhered under heating, it is preferable that the substrate sheet is kept at a temperature which is the same as or higher by 20° C. than the melting point of the resin in the substrate sheet.

The melting point of a resin can be measured in accordance with DTA (differential thermal analysis). Melting points of typical polyolefin resins are as follows: crystalline polypropylene: about 165° C.; high density polyethylene: about 140° C.; and low density polyethylene: about 110° C.

When the laminate material is a different type from the resin of the substrate sheet, such as a metal sheet, a film of an acrylic resin, a film of a polyamide resin or a film of a polyurethane resin, or when the laminate material is a transfer film, the lamination by melt adhesion under heating is not possible. Therefore, the laminate material is generally used in combination with an adhesive layer and laminated using the adhesive layer in accordance with the dry lamination process. When the substrate sheet is made of a polypropylene resin, even a film of a polyethylene resin cannot be melt adhered under heating and lamination using an adhesive layer is preferable.

Preferable example of the adhesive layer include films made of the same type of materials as that of the substrate sheet or layers of adhesive materials containing, as the main component, materials showing adhesive property under heating such as chlorinated polyolefin resins, polyurethane resins, epoxy resins, acrylic resins, vinyl resins, vinyl acetate resins, polyester resins, ethylene-vinyl acetate copolymer resins, polyamide resins and ionomer resins. The adhesive layer preferably has a thickness of about 1 to 20 $\mu$m.

When a film made of the same type of material as that of the substrate sheet is used as the adhesive layer, it is advantageous that the film is adhered to the back side of the laminate material using a urethane adhesive material or an acrylic adhesive material in advance. Melt adhesion under heating of the laminate material becomes possible in accordance with this method.

When a layer of an adhesive material is used as the adhesive layer, it is preferable that the temperature of the substrate sheet is adjusted around the melting point of the adhesive material.

When the laminate sheet is prepared in accordance with a batch process, one or more types of the desired laminate material is placed on at least one face of a substrate sheet made of a polyolefin resin and the obtained combination is pressed under heating to prepare a laminate sheet having one or more laminated layers. The type of the laminate material and the temperature of heating are the same as those described above on the continuous process for preparing a laminate sheet.

To prepare a laminate sheet by pressing as described above, lamination by melt adhesion under heating or dry lamination may be used. The lamination by melt adhesion under heating is industrially more advantageous.

In the process of the present invention, the laminate sheet having one or more laminated layers or the sheet of a thick single layer which is prepared in step (a) and at a high temperature is continuously cooled in step (b). In step (b), the sheet is passed between a lower endless metal belt and an upper endless metal belt disposed on top of the lower endless metal belt in mechanism (B) described above. Both belts are in movement along a loop surrounding two rolls and cooled directly with cooling water.

In the cooling step, a plurality of cooling apparatuses may be arranged in series and the temperature of a lower endless metal belt and a upper endless metal belt disposed on top of the lower belt in each cooling apparatus is adjusted while in movement along the loop in a manner such that the temperature of the belts in a cooling apparatus at a downstream position is successively lower than the temperature of the belts in a cooling apparatus at an upstream position, each endless metal belt in the cooling apparatus at the most upstream position is directly cooled with water at a temperature of 10 to 40° C. and each endless metal belt in the cooling apparatus at the most downstream position is directly cooled with water at a temperature of 4 to 10° C. Thus, the laminate sheet or the sheet of a thick single layer at a high temperature is cooled in a plurality of stages and preferably in two stages. Alternatively, one cooling apparatus may be used and each of a lower endless metal belt and a upper endless metal belt disposed on top of the lower belt in the cooling apparatus is cooled while in movement along the loop in a manner such that a portion of the belt at an upstream position is directly cooled with water at a temperature of 10 to 40° C. and a portion of the belt at a downstream position is directly cooled with water at a temperature of 4 to 10° C. Thus, the laminate sheet or the sheet of a thick single layer at a high temperature may be cooled.

The laminate sheet or the sheet of a thick single layer at a high temperature can be efficiently cooled approximately to the room temperature in accordance with the above processes.

In the present invention, a clear coat layer may be formed on the surface of the laminate sheet or the sheet of a thick single layer cooled as described above to provide wear resistance, weatherability, scratch resistance and antifouling property to the sheet. It is preferable that the clear coat layer is formed to a thickness of about 10 to 200 $\mu$m by application of a coating material such as a coating material of an ultraviolet light curing type.

When the laminate sheet or the sheet of a thick single layer is prepared in accordance with the continuous process in step (a) for preparing a plastic sheet, a step of cutting the sheet to a desired dimension is conducted as the final step.

The plastic sheet thus obtained may be subjected to fabrication such as V cutting, formation of tongues and formation of thread shapes.

The laminate sheet obtained in accordance with the process of the present invention can be used in various applications, for example, as decorative sheets, decorative panels and decorative building materials. When the laminate sheet is used as a decorative sheet, the sheet can be used as the decorative sheet at the surface by adhesion to a wood substrate such as wood, a veneer board, a laminated lumber, a particle board and a hard board, a metal substrate such as a steel plate, a stainless steel plate and aluminum plate and an inorganic substrate such as a gypsum board in a manner such that the substrate sheet of the laminate sheet is adhered to the above substrate.

The sheet of a thick single layer obtained in accordance with the process of the present invention can be used as various products such as chopping boards and molding frames for concrete.

To summarize the advantages obtained by the present invention, the laminate sheet having one or more laminated layers or the sheet of a thick single layer prepared using a polyolefin molding material containing an inorganic filler and a polyolefin resin as the substrate material can be produced without warp, with excellent flatness, in a reduced cooling time and with excellent productivity.

EXAMPLES

The present invention will be described more specifically with reference to examples in the following. However, the present invention is not limited to the examples.

Example 1

(1) Preparation of a Polypropylene Film Having a Patterned Layer

Both faces of an unstretched transparent polypropylene film having a thickness of 60 $\mu$m (manufactured by FUTAMURA CHEMICAL INDUSTRY Co., Ltd.; trade name: FHK2) were treated by corona discharge. One face of the film was printed with a wood pattern of oak with inks of three colors using a gravure printing machine and a polypropylene film having a patterned layer was prepared.

(2) Preparation of a Resin Composition for a Substrate Sheet

Homopolypropylene (manufactured by IDEMITSU PETROCHEMICAL Co., Ltd.; trade name: E-100G) in an amount of 45 parts by weight, 55 parts by weight of calcium carbonate having an average particle diameter of 4 $\mu$m and 0.2 parts by weight of a phenolic antioxidant were dry blended and then melt mixed by a twin screw extruder to prepare a resin composition for a substrate sheet in a pellet form.

The homopolypropylene had a melting point of 165° C.

(3) Preparation of a Laminate Sheet

An apparatus having a mechanism for continuously preparing a sheet and the cooling mechanism shown in FIG. 2 was used as the apparatus for the preparation. In this cooling mechanism, a stainless steel belt having a width of 1,500 mm and a thickness of 1 mm was used as the upper endless metal belt 9. A stainless steel belt having a width of 1,400 mm and a thickness of 1 mm was used as the lower endless metal belt 9'. An upstream portion of each belt was cooled with cooling water at 33° C. and a down stream portion of each belt was cooled with cooling water at 4° C. The length of the cooled portion was about 20 m.

To a substrate sheet having a thickness of 5 mm obtained from the resin composition prepared in (2), an olefin elastomer film (manufactured by RIKEN VINYL INDUSTRY Co., Ltd.; trade name: RIBESTAR) which had a thickness of 0.1 mm and was colored white and treated on one face with urethane coating layer was continuously laminated in a manner such that the face of the film not coated with the urethane coating layer was adhered to the substrate sheet. To the obtained laminate, the polypropylene film having a patterned layer which was prepared in (1) was laminated in a manner such that the patterned layer was adhered to the olefin elastomer film treated with the urethane coating. A biaxially stretched polyethylene terephthalate film having a thickness of 38 $\mu$m (manufactured by FUTAMURA CHEMICAL INDUSTRY Co., Ltd.) was then dry laminated to the polypropylene film having a patterned layer of the obtained laminate.

The thus prepared laminate film was heated so that the temperature at the central portion of the laminate reached about 150° C. to remove warp and transferred continuously to the cooling mechanism to cool approximately to the room temperature. After the cooled sheet was cut, laminate sheets shown in FIG. 3 which had a width of 1,200 mm and a length of 2,400 mm were obtained continuously with excellent productivity.

Figure 3:
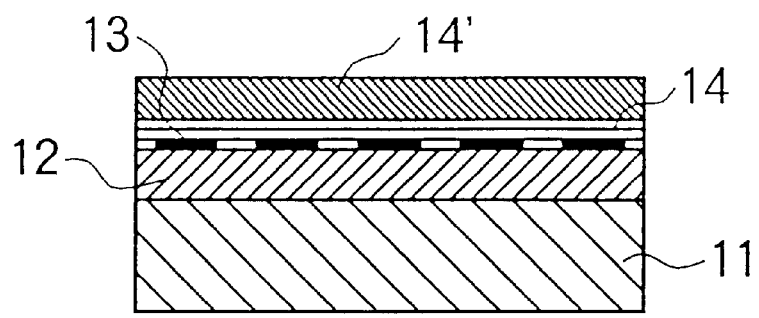
FIG. 3 shows a section view of a laminate prepared in Example 1.

FIG. 3 shows a section view of the laminate sheet prepared in the present example. The laminate sheet had a structure in which a layer of the colored olefin elastomer film 12, a patterned layer 13, a layer of the transparent polypropylene film 14 and a layer of the biaxially stretched polyethylene terephthalate film 14' were successively laminated to the surface of the substrate sheet 11 made of the polypropylene resin.

The laminate sheet was in an excellent condition without warp, exhibited a pattern of a high grade wood and could be advantageously used as a decorative panel.

Example 2

(1) Preparation of an Aluminum Sheet Having an Adhesive Layer

An aluminum sheet having a thickness of 150 $\mu$m (manufactured by SHOWA ALUMINUM CORPORATION; trade name: ALUMINUM FOIL) was degreased with a cleaning solution for degreasing and then treated with a silane coupling agent at the surface. One face of the prepared aluminum sheet was coated with a chlorinated polyolefin resin (manufactured by NIPPON PAPER INDUSTRIES Co., Ltd.; trade name: SUPERCHLON) to form an adhesive layer having a thickness of 5 $\mu$m.

(2) Preparation of an Acrylic Resin Film Having a Patterned Layer

One face of a transparent film of an acrylic resin having a thickness of 50 $\mu$m (manufactured by KANEKA CORPORATION; trade name: SANDUREN FILM) was printed with a wood pattern of oak with inks of three colors using a gravure printing machine to form a patterned layer. The formed patterned layer was coated with the chlorinated polyolefin resin described above to form an adhesive layer having a thickness of 5 $\mu$m.

(3) Preparation of a Laminate Sheet

The same apparatus as that used in Example 1 was used as the apparatus.

To both faces of a substrate sheet having a thickness of 4 mm which was obtained from the resin composition prepared in Example 1(2), the aluminum sheet having an adhesive layer which was obtained in (1) was continuously dry laminated in a manner such that the adhesive layer is placed between the aluminum sheet and the substrate sheet. To the aluminum sheet laminated to one side of the substrate, the acrylic resin film having a patterned layer which was obtained in (2) was continuously dry laminated in a manner such that the adhesive layer is placed between the acrylic film and the aluminum sheet.

Figure 4:
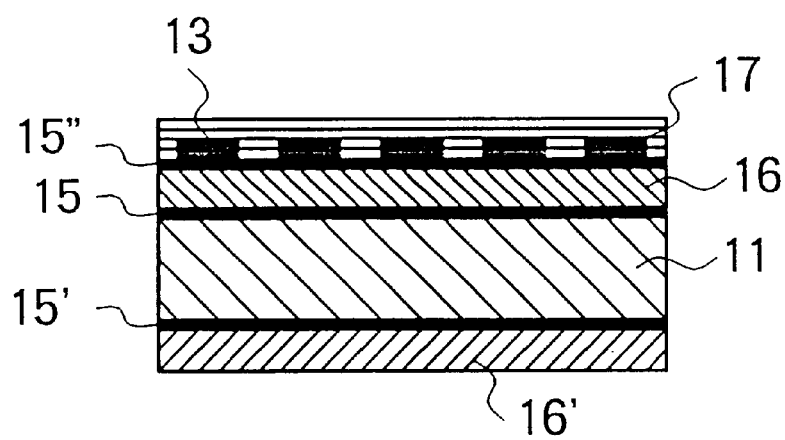
FIG. 4 shows a section view of a laminate prepared in Example 2.

The thus prepared laminate film at a temperature of about 150° C. was transferred continuously to the cooling mechanism to cool approximately to the room temperature. After the cooled sheet was cut, laminate sheets shown in FIG. 4 which had a width of 1,000 mm and a length of 2,000 mm were obtained continuously with excellent productivity. FIG. 4 shows a section view of the laminate sheet prepared in the present example. The laminate sheet had a structure in which the adhesive layer 15, a layer of the aluminum sheet 16, the adhesive layer 15'', the patterned layer 13 and a layer of the acrylic resin film were successively laminated to the face of the substrate sheet 11 made of the polypropylene resin. A layer of the aluminum sheet 16' was laminated to the other face of the substrate sheet 11 made of polypropylene resin in a manner such that the adhesive layer 15' was placed between the aluminum sheet and the substrate sheet.

The laminate sheet showed excellent workability and impact resistance, no warp, exhibited a specific pattern of a high grade wood and could be advantageously used as a decorative panel.

Example 3

(1) Preparation of a Laminate Material Having a Patterned Layer

One face of polyethylene synthetic paper having a thickness of 90 $\mu$m (manufactured by TATSUNO CHEMICAL INDUSTRY Co., Ltd.; trade name: TOUGHPER) was printed with a wood pattern of oak with inks of three colors using a gravure printing machine. To the other face of the synthetic paper, an adhesive polypropylene film having a thickness of 40 $\mu$m was dry laminated using a reactive urethane adhesive material and a laminate material having a patterned layer was prepared.

(2) Preparation of a Laminate Sheet

The same apparatus as that used in Example 1 was used as the apparatus.

To one face of a substrate sheet having a thickness of 5 mm which was obtained from the resin composition prepared in Example 1(2), the laminate material having a patterned layer which was obtained in (1) was continuously dry laminated in accordance with the melt adhesion under heating in a manner such that the polypropylene film was adhered to the substrate sheet.

Figure 5:
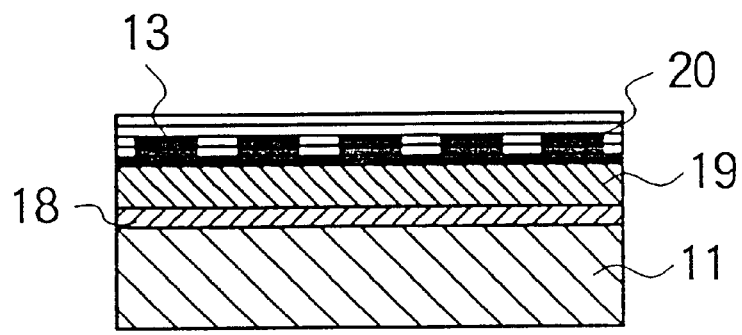
FIG. 5 shows a section view of a laminate prepared in Example 3.

The thus prepared laminate film was heated so that the temperature at the central portion of the laminate reached about 150° C. to remove warp and transferred continuously to the cooling mechanism to cool approximately to the room temperature. The patterned layer was coated with an acrylic coating material of an ultraviolet light curing type. Then, the coating material was cured and a clear coating layer having a thickness of 40 μm was formed. After the obtained sheet was cut, laminate sheets shown in FIG. 5 which had a width of 1,200 mm and a length of 2,400 mm were obtained continuously with excellent productivity. FIG. 5 shows a section view of the laminate sheet prepared in the present example. The laminate sheet had a structure in which the polyethylene synthetic paper 19 having the patterned layer 13 was laminated to the surface of the substrate sheet made of the polypropylene resin 11 in a manner such that the layer of the adhesive polypropylene film 18 was placed between the synthetic paper and the substrate sheet and a layer of the clear coat 20 was formed on the patterned layer 13.

The laminate sheet showed excellent workability without warp and excellent scratch resistance, exhibited a specific pattern of a high grade wood and could be advantageously used as a decorative panel.

Example 4

(1) Preparation of a Laminate Material Having a Pattern of Black Granite

A mixture containing 70 parts by weight of random polypropylene (manufactured by IDEMITSU PETROCHEMICAL Co., Ltd.; trade name: F-534 N-4), 20 parts by weight of a hydrogenated styrene-butadiene copolymer (manufactured by JSR CORPORATION; trade name: DYNALON 1320 P), 4 parts by weight of a pulverized black polyethylene terephthalate and 6 parts by weight of a pulverized white polyethylene terephthalate was mixed by a mixing roll at a roll temperature of 170° C. for 5 minutes. A sheet having a thickness of 1 mm was prepared from the obtained mixture to obtain a laminate material having a pattern of black granite.

(2) Preparation of a Laminate Sheet

The same apparatus as that used in Example 1 was used as the apparatus.

To one face of a substrate sheet having a thickness of 3 mm which was obtained from the resin composition prepared in Example 1(2), the laminate sheet having a pattern of black granite which was obtained in (1) was laminated continuously by melt adhesion under heating. To the other face of the substrate, a non-woven fabric of polyethylene terephthalate having a thickness of 30 g/m² was laminated continuously by melt adhesion under heating.

The thus prepared laminate film was heated so that the temperature at the central portion of the laminate reached about 150° C. to remove warp and transferred continuously to the cooling mechanism to cool approximately to the room temperature. After the cooled sheet was cut, laminate sheets shown in FIG. 6 which had a width of 1,200 mm and a length of 2,400 mm were obtained continuously with excellent productivity.

Figure 6:
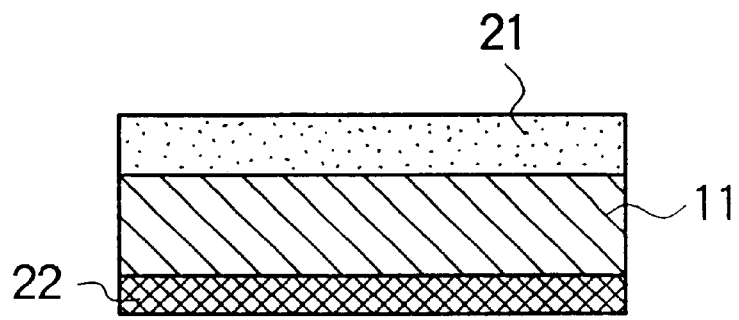
FIG. 6 shows a section view of a laminate prepared in Example 4.

FIG. 6 shows a section view of the laminate sheet prepared in the present example. The laminate material 21 having a pattern of black granite was laminated to one face of the substrate sheet 11 made of a polypropylene resin and the non-woven fabric 22 of polyethylene terephthalate was laminated to the other face of the substrate sheet 11.

The laminate sheet was in an excellent condition without warp, exhibited a pattern of a high grade black granite and could be advantageously used as a decorative panel.

Example 5

The same apparatus as that used in Example 1 was used as the apparatus.

A sheet of a thick single layer which had a thickness of 10 mm was continuously prepared using the resin composition prepared in Example 1(2). The prepared sheet was heated so that the temperature at the central portion of the laminate reached about 150° C. to remove warp and transferred continuously to the cooling mechanism to cool approximately to the room temperature. After the cooled sheet was cut, sheets of a thick single layer which had a width of 900 mm and a length of 1,800 mm were obtained continuously without warp with excellent productivity.

Example 6

A laminate sheet which had the same construction as that of the laminate sheet obtained in Example 1 and had a width of 1,200 mm and a length of 2,400 mm was prepared in accordance with the batch pressing process at a temperature of about 170° C. The prepared laminate sheet at a high temperature was transferred to the same cooling mechanism as that used in Example 1 and continuously cooled approximately to the room temperature. Thus, a laminate sheet having a high grade wood pattern was obtained without warp with excellent productivity.

What is claimed is:

1. A process for producing a plastic sheet comprising the steps of:
    (a) preparing a plastic sheet which is a laminate sheet comprising one or more laminated layers or a sheet of a thick single layer at a high temperature using a polyolefin molding material comprising an inorganic filler and a polyolefin resin as a substrate material; and
    (b) cooling the plastic sheet by passing between a lower endless metal belt and an upper endless metal belt disposed on top of the lower belt in each of a plurality of cooling apparatuses, each belt being disposed with tension along a loop surrounding two rolls, moving along the loop and being cooled by direct contact with cooling water,
    wherein a temperature of the lower endless metal belt and the upper endless metal belt disposed on top of the lower belt in each cooling apparatus is adjusted while the belts are in movement along the loop in a manner such that a temperature of the belts in a cooling apparatus at a downstream position is successively lower than a temperature of the belts in another apparatus at an upstream position, the belts in a cooling apparatus at a most upstream position are directly cooled with water at a temperature of 10 to 40° C. and the belts in a cooling apparatus at a most downstream position are directly cooled with water at a temperature of 4 to 10° C.

2. The process for producing a plastic sheet according to claim 1, wherein the polyolefin molding material comprises 20 to 80% by weight of an inorganic filler.

3. The process for producing a plastic sheet according to claim 2, wherein the polyolefin molding material comprises 30 to 70% by weight of an inorganic filler.

4. The process for producing a plastic sheet according to claim 2, wherein the inorganic filler is at least one filler selected from the group consisting of calcium carbonate, aluminum hydroxide and a magnesium hydroxide.

5. A process for producing a plastic sheet comprising the steps of:
   (a) preparing a plastic sheet which is a laminate sheet comprising one or more laminated layers or a sheet of a thick single layer at a high temperature using a polyolefin molding material comprising an inorganic filler and a polyolefin resin as a substrate material; and
   (b) cooling the plastic sheet by passing between a lower endless metal belt and an upper endless metal belt disposed on top of the lower belt, each belt being disposed with tension along a loop surrounding two rolls, moving along the loop and being cooled by direct contact with cooling water,
      wherein each of the lower endless metal belt and the upper endless metal belt disposed on top of the lower belt is cooled while the belt is in movement along the loop in a manner such that a portion of the belt at an upstream position is directly cooled with water at a temperature of 10 to 40° C. and a portion of the belt at a downstream position is directly cooled with water at a temperature of 4 to 10° C.

6. The process for producing a plastic sheet according to claim 5, wherein the polyolefin molding material comprises 20 to 80% by weight of an inorganic filler.

7. The process for producing a plastic sheet according to claim 6, wherein the polyolefin molding material comprises 30 to 70% by weight of an organic filler.

8. The process for producing a plastic sheet according to claim 6, wherein the inorganic filler is at least one filler selected from the group consisting of calcium carbonate, aluminum hydroxide and magnesium hydroxide.

* * * * *